(12) United States Patent
Disselnkoetter et al.

(10) Patent No.: US 10,386,246 B2
(45) Date of Patent: Aug. 20, 2019

(54) NONINTRUSIVE TEMPERATURE MEASURING APPARATUS

(71) Applicant: ABB Schweiz AG, Baden (CH)

(72) Inventors: Rolf Disselnkoetter, Mauer (DE); Joerg Gebhardt, Mainz (DE); Stephan Wildermuth, Laudenbach (DE)

(73) Assignee: ABB SCHWEIZ AG, Baden (CH)

( * ) Notice: Subject to any disclaimer, the term of this patent is extended or adjusted under 35 U.S.C. 154(b) by 133 days.

(21) Appl. No.: 15/473,683

(22) Filed: Mar. 30, 2017

(65) Prior Publication Data
US 2017/0284873 A1 Oct. 5, 2017

(30) Foreign Application Priority Data

Mar. 31, 2016 (DE) .................. 10 2016 105 949

(51) Int. Cl.
*G01K 11/22* (2006.01)
*G01K 1/02* (2006.01)
(Continued)

(52) U.S. Cl.
CPC .............. *G01K 11/22* (2013.01); *G01K 1/024* (2013.01); *G01K 1/143* (2013.01); *G01K 13/02* (2013.01); *G01K 2215/00* (2013.01)

(58) Field of Classification Search
USPC ................................. 374/147, 141, 208, 163
See application file for complete search history.

(56) References Cited

U.S. PATENT DOCUMENTS 8,152,367 B2    4/2012   Roberts et al.
2010/0111135 A1 5/2010   Faries, Jr. et al.
                (Continued)

FOREIGN PATENT DOCUMENTS

CN    201732466 U    2/2011
CN    103308196 A    9/2013
                (Continued)

OTHER PUBLICATIONS

Burns Engineering The Temperature Measurement Experts, http://www.burnsengineering.com/local/local/uploads/files/snx_family.pdf20, Mar. 6, 2017, p. 1.
(Continued)

*Primary Examiner* — Mirellys Jagan
(74) *Attorney, Agent, or Firm* — Leydig, Voit & Mayer, Ltd.

(57) ABSTRACT

A nonintrusive temperature measuring apparatus for measuring the fluid temperature in at least partially thermally insulated tubes of installations in the processing industry, has the tube is completely sheathed by a thermal insulation layer at least at the measurement point, wherein a sensor electronics system with a temperature sensor is mounted onto the tube within the thermal insulation layer, a connecting electronics system is arranged outside the thermal insulation layer, and wherein the sensor electronics system and the connecting electronics system have one or more energy transmitters for wireless energy transmission for supplying the sensor electronics system and one or more temperature transmitters for wireless communication for transmitting the temperature measurement values from the sensor electronics system to the connecting electronics system.

10 Claims, 3 Drawing Sheets

(51) Int. Cl.
*G01K 1/14* (2006.01)
*G01K 13/02* (2006.01)

(56) References Cited

U.S. PATENT DOCUMENTS

| | | | |
|---|---|---|---|
| 2012/0114013 A1 | 5/2012 | Tsuchida | |
| 2013/0136152 A1* | 5/2013 | Draeger | G01K 7/00 374/183 |
| 2014/0036956 A1 | 2/2014 | Goto | |
| 2014/0305524 A1* | 10/2014 | Heizer | F17D 5/00 137/551 |
| 2014/0305930 A1* | 10/2014 | Heizer | G08C 17/02 219/539 |
| 2015/0260587 A1* | 9/2015 | Zheng | G01K 11/265 374/117 |
| 2015/0268111 A1* | 9/2015 | Hedtke | G01L 7/022 73/700 |
| 2016/0047697 A1 | 2/2016 | Decker et al. | |
| 2017/0234818 A1* | 8/2017 | Jesme | A61B 5/443 374/54 |

FOREIGN PATENT DOCUMENTS

| | | |
|---|---|---|
| CN | 103594392 A | 2/2014 |
| DE | 102014012086 A1 | 2/2016 |
| JP | 2004127276 A | 4/2004 |
| JP | 2004279397 A | 10/2004 |
| JP | 2007037631 A | 2/2007 |
| JP | 2009053025 A | 3/2009 |
| JP | 4980823 B2 | 4/2012 |
| WO | WO 2014195721 A1 | 12/2014 |
| WO | WO 2015023462 A1 | 2/2015 |

OTHER PUBLICATIONS

Sengenuity, "Wireless SAW Temperature Sensing System for Switchgear", Sep. 23, 2013, pp. 1-4.

Rogie I. Rodriguez, et al., ,,A wireless inductive-capacitive (L-C) sensor for rotating component temperature monitoring, International Journal on Smart Sensing and Intelligent Systems, vol. 4, No. 2, Jun. 2011, pp. 325-337.

* cited by examiner

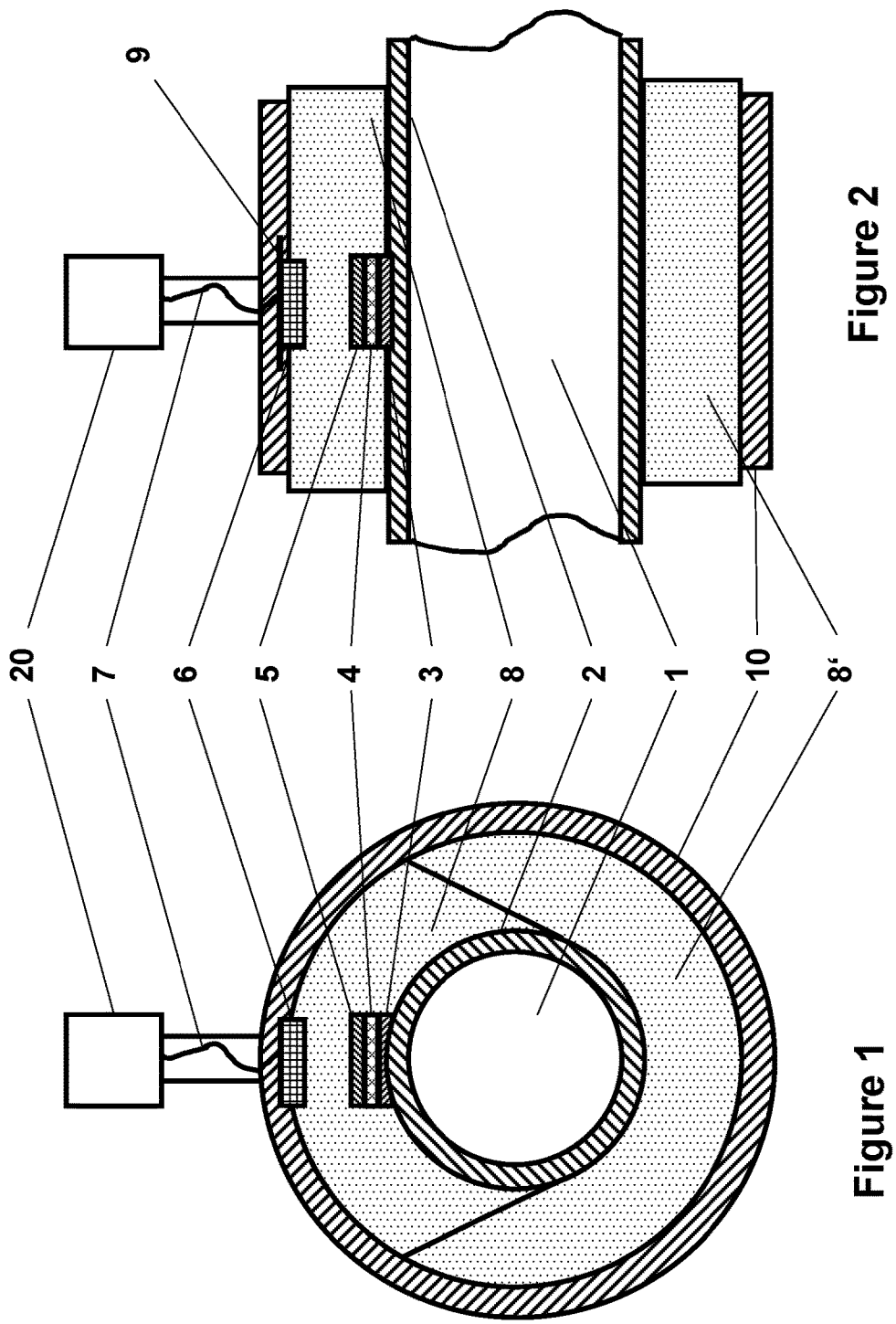

NONINTRUSIVE TEMPERATURE MEASURING APPARATUS

CROSS-REFERENCE TO RELATED APPLICATIONS

Priority is claimed to German Patent Application No. DE 10 2016 105 949.8, filed on Mar. 31, 2016, the entire disclosure of which is hereby incorporated by reference herein.

FIELD

The invention relates to a nonintrusive temperature measuring apparatus for measuring the fluid temperature in at least partially thermally insulated tubes of installations in the processing industry.

BACKGROUND

To date, mainly (intrusive) installation solutions have been known which have various disadvantages: the temperature sensor already has to be installed during construction of the installation as far as possible. If retrofitting is required, it is necessary either
 for there to already be an installation opening for the sensor or
 for a hole to be drilled and a thermowell to be welded in. The temperature sensor is inserted into this thermowell. This is not possible during operation, and accordingly the installation has to be temporarily switched off. A solution of this kind is known, for example, from the publication http://www.burnsengineering.com/local/local/uploads/files/snx_family.pdf20.

In this document, the solution is referred to as being nonintrusive since the actual sensor is not immersed in the fluid.

In the case of nonintrusive sensor solutions, the sensor is placed on the outside of the tube and the fluid temperature is indirectly inferred by means of measuring the tube temperature. The problem faced here is that, on account of the ambient temperature which usually differs from the fluid temperature, a flow of heat is generated between the fluid and the surrounding area across the tube wall and any boundary layers, this flow of heat, by means of the upstream thermal resistances, causing corresponding temperature differences and therefore faulty temperature measurement.

In order that these differences remain as low as possible (as far as possible <1K), a thermal insulation is provided, inter alia, around the tube, said thermal insulation reducing the radial heat flow and therefore the error in temperature measurement. The problem faced here is that, in the case of known solutions, the thermal insulation in the vicinity of the sensor is interrupted owing to the required electrical and mechanical sensor connections and a portion of the heat flows away in the radial direction via these connections. This heat flow generates further measurement errors and secondly requires very good thermal coupling of the sensor at the curved tube surface. A procedure of this kind is, however, complicated to implement in the case of retrofit applications. This is particularly true since the electronics system which is connected by means of the sensor element (generally a Pt100) has to be electrically insulated from the tube wall. The embedding of said sensor element has to be designed primarily for electrical strength and can therefore only secondarily be optimized for good thermal contact. This necessarily leads to poor thermal coupling since electrically insulating materials also conduct heat poorly. In general, the Pt100 is surrounded by a few millimeters of ceramic powder in the cap of the temperature sensor.

Alternative solutions in which the sensor lines are initially routed some way along the tube in the axial direction in order to reduce the corresponding heat flow in the vicinity of the sensor also have disadvantages. Firstly, said solutions are associated with considerable installation costs. In addition, the problem of high thermal resistance between the Pt100 and the tube is not solved, but rather increases only the thermal resistance to the surrounding area owing to the closed insulation. Although the absolute accuracy in the stationary state is improved in this way, the response time of the sensor is not improved. However, rapid response of the sensor is likewise required.

Wireless methods for temperature measurement are known from various applications, but not against the background of improved measurement accuracy in cases in which there are unavoidable and significant thermal resistances between the object of the temperature measurement and the actual measurement point.

The publication http://www.sengenuity.com/tech_ref/Smart_Grid_Solutions_Leveraging_SAW.pdf discloses wireless measurement for potential-free monitoring of the temperature of solid conductor and contact elements in switchgear installations by means of SAW sensors, without batteries or energy harvesting methods being required.

U.S. Pat. No. 8,152,367 B2 describes an intrusive temperature measurement operation in a closed container, without said container requiring a bushing.

The INTERNATIONAL JOURNAL ON SMART SENSING AND INTELLIGENT SYSTEMS, VOL. 4, NO. 2, JUNE 201, published under http://www.s2is.org/Issues/v4/n2/papers/paper10.pdf, discloses temperature measurement on rotating machines without mechanical contact.

SUMMARY

An aspect of the invention provides a nonintrusive temperature measuring apparatus for measuring fluid temperature in one or more at least partially thermally insulated tubes of an installation in the processing industry, the apparatus comprising: a tube completely sheathed by a thermal insulation layer at least at a measurement point; a sensor electronics system including a temperature sensor, mounted onto the tube within the thermal insulation layer; a connecting electronics system, arranged outside the thermal insulation layer; wherein the sensor electronics system and the connecting electronics system include an energy transmitter configured for wireless energy transmission for supplying the sensor electronics system, and wherein the sensor electronics system and the connecting electronics system each include a temperature transmitter configured for wireless communication of temperature measurement values from the sensor electronics system to the connecting electronics system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 an illustration of a cross section through a tube with a nonintrusive measuring device;

FIG. 2 an illustration through a longitudinal section of a tube with a nonintrusive measuring device;

DETAILED DESCRIPTION

Figure 3:
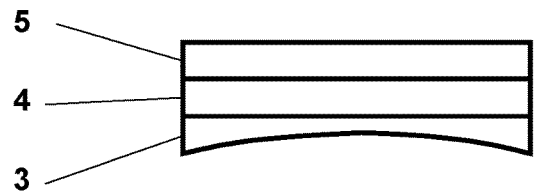
FIG. 3 an illustration of a detail of the mechanical structure of the thermal contact promoting means of the temperature sensor.

An aspect of the invention is therefore based on the object of specifying a nonintrusive temperature sensor for measuring the fluid temperature in tubes of installations in the processing industry, which temperature sensor determines the fluid temperature with a high degree of measurement accuracy without having an adverse effect on the thermal insulation of the tubes.

An aspect of the invention proceeds from a tube which is equipped with a nonintrusive temperature measuring device.

An aspect of the invention provides a measuring device for nonintrusively determining the fluid temperature in the tube which is completely sheathed by a thermal insulation layer at least at the measurement point, which measuring device comprises a sensor electronics system with a temperature sensor and comprises a connecting electronics system having a processing unit, a communication unit and also an energy supply unit, wherein the sensor electronics system is arranged within this surrounding, thermal insulation layer, and the connecting electronics system is arranged outside this insulation layer. The connecting electronics system and the sensor electronics system have means for wireless energy transmission for supplying the sensor electronics system from the energy supply unit and have means for wireless communication for transmitting the temperature measurement values from the sensor electronics system to the connecting electronics system. The temperature sensor of the sensor electronics system is arranged on the outer surface of the tube directly or by means of a thermal contact promoting device (tube adapter) for increasing the size of the contact area.

In the case of a tube which is thermally insulated from the environment, the tube wall assumes the fluid temperature. Therefore, the temperature sensor also assumes the temperature of the tube wall—that is to say the fluid temperature—virtually without delay. As a result, the fluid temperature is measured with a high degree of accuracy and a short response time of the measuring device. At the same time, the connecting electronics system is completely electrically insulated from the tube wall.

As a result of the wireless transmission of energy and measurement values between the sensor electronics system and the connecting electronics system, the thermal insulation layer is uninterrupted at the site of measurement, and therefore thermal losses and also resulting corruption of measurement values are avoided.

FIG. 1 shows a cross section through a tube 2 for conducting a fluid and having a nonintrusive measuring device, and FIG. 2 shows a longitudinal section through said tube, using the same reference symbols for identical means. The tube 2 is completely embedded in a surrounding thermal insulation 8, 8' at the measurement point. In this case, the thermal insulation 8, 8' can be of integral design or can be composed of several parts 8, 8'. The thermal insulation 8, 8' can be subsequently applied to the outside of the tube 2 and is clamped around the tube 2 and held in place by a device for mechanical fixing 10.

A temperature sensor 4 which is connected to a sensor electronics system 5 is arranged on the surface of the tube 2 within the thermal insulation 8, 8'. The temperature sensor 4 and the sensor electronics system 5 are, together with a tube adapter 3, mounted on the surface of the tube 2. The tube adapter 3 is matched to the outside diameter of the tube 2 at the tube end and is matched to the contour of the temperature sensor 4 and of the sensor electronics system 5 at the sensor end. Good thermal contact between the temperature sensor 4 and the surface of the tube 2 is achieved in this way. The temperature sensor 4, the sensor electronics system 5 and the tube adapter 3 are embedded into the thermal insulation 8, 8' which completely surrounds the tube 2 at this point. As a result, changes in temperature due to radial and/or axial flows of heat at the measurement point are avoided and the measurement accuracy is increased.

A connecting electronics system 6 which is fixed in position by means of a holder 9 is arranged outside the thermal insulation 8, 8'. In a further refinement of the invention, the connecting electronics system 6 is connected to a local display unit 20 via a connection cable 7.

The thermal insulation 8, 8' is composed of foam material, preferably hard foam, and is equipped with cutouts for receiving the temperature sensor 4 and the sensor electronics system 5. The thermal insulation 8, 8' is advantageously of two-part design. Fitting of a tube 2 which has already been laid is made easier in this way. This advantage comes into its own particularly in the case of retrofitting.

According to a further feature of the invention, the thermal insulation 8, 8' is divided geometrically along the tangent on the surface of the tube 2. Improved thermal insulation in relation to radial division by a longer separating gap is achieved in this way. The temperature sensor 4 is preferably arranged in the middle of the half-shell of the thermal insulation 8. The effect of heat losses at the dividing gaps between the half-shells of the thermal insulation 8, 8' is avoided in this way.

According to a further feature of the invention, the thermal insulation 8, 8' has a sufficient radial material thickness and a high enough thermal resistance in order to reduce the radial heat losses to a minimum. A maximum temperature difference between the sensor temperature and the fluid temperature of less than 1K is aimed for here.

According to a further feature of the invention, the fixing means 10 comprises a metal clip, which surrounds the thermal insulation 8, 8', or strips which have a closure mechanism. This closure mechanism can have a folding lever or screw-connection options. Furthermore, the fixing means 10 is designed as a carrier of the local display unit 20 with the interface for remote communication to a superordinate unit.

FIG. 3 shows the mechanical structure of the thermal contact promoting means of the temperature sensor 4 in detail. The tube adapter 3 is matched to the geometric shape of the tube 2 at the tube end and to the contour of the temperature sensor 4 and also of the sensor electronics system 5 on the side which is averted from the tube 2.

In a first embodiment, the tube adapter 3 is formed from an elastic, thermally conductive carrier material. In particular, a rubber carrier which is filled with thermally conductive material can be provided as the tube adapter 3.

In a second embodiment, the tube adapter 3 is composed of a deformable metal foam which is matched to the specific contour of the surface of the tube 2 under pressure. Metal foams which are composed of silver or aluminum are particularly suitable for this purpose.

Figure 4:
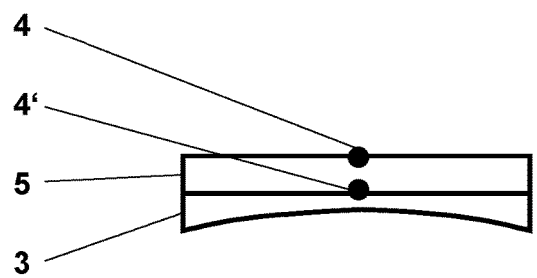
FIG. 4 an alternative illustration of a detail of the mechanical structure of the thermal contact promoting means of the temperature sensor.

Depending on the design of the temperature sensor 4, provision can be made according to FIG. 4 to arrange a flat temperature sensor 4 between the tube adapter 3 and the sensor electronics system 5 parallel to the sensor electronics system 5.

As an alternative, provision can be made to integrate the temperature sensor 4 on the carrier (printed circuit board) of the sensor electronics system 5 and to match that side of the tube adapter 3 which is averted from the tube 2 to the contour of the temperature sensor 4 and also of the sensor electronics system 5. In this case, the temperature sensor 4 can be arranged on that side of the sensor electronics system 5 which is averted from the tube 2 or as temperature sensor 4' on that side of the sensor electronics system 5 which faces the tube 2.

As a measure which improves the invention, a thermally conductive paste can be provided between the tube adapter 3 and the temperature sensor 4 and/or between the tube adapter 3 and the tube 2. As an alternative, provision can be made to fix the temperature sensor 4 on the tube adapter 3 by means of thermally conductive adhesive.

Furthermore, thermal coupling of the temperature sensor 4 to the tube 2 can be improved by a spring which at least presses the temperature sensor 4 against the tube 2. The sensor electronics system 5 can be included in the force-fitting connection depending on the design of the temperature sensor 4.

Figure 5:
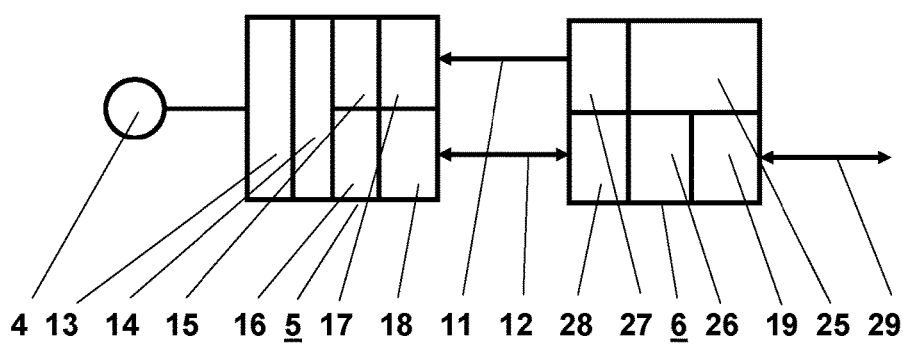
FIG. 5 an illustration (block diagram) of a detail of the sensor electronics system and of the connecting electronics system.

FIG. 5 shows the sensor electronics system 5 and the connecting electronics system 6 in detail. The sensor electronics system 5 comprises at least an analog signal conditioning means 13 and a transceiver unit 16 with associated transmitting and receiving antennas 18. In a preferred embodiment, the sensor electronics system 5 is furthermore equipped with an analog/digital converter 14. Furthermore, the sensor electronics system 5 is equipped with an energy supply unit 15 and also coils for the inductive energy supply means 17. The temperature sensor 4 is connected to the analog signal conditioning means 13

The connecting electronics system 6 comprises an energy supply unit 25, a transceiver unit 26 and a communication interface 19. The power supply unit 25 has associated coils for the inductive energy supply means 27 of the sensor electronics system 5. The transceiver unit 26 is connected to transmitting and receiving antennas 28. External communication 29 takes place by means of the communication interface 19.

The sensor electronics system 5 is supplied with electrical energy wirelessly from the energy supply unit 25 of the connecting electronics system 6. To this end, the coils for the inductive energy supply means 27 are excited by an alternating current. A voltage is induced in the coils for the inductive energy supply means 17 of the sensor electronics system 5 in the alternating field of the coils for the inductive energy supply means 27, said voltage being conditioned in the energy supply unit 15 for feeding to the sensor electronics system 5.

The coils for the inductive energy supply means 17 and 27 are advantageously in the form of planar coils which are printed onto the printed circuit board of the sensor electronics system 5 and also of the connecting electronics system 6. As an alternative, integrated planar coils can be provided in an electronic circuit. Inductive coupling between the coils for the inductive energy supply means 17 and 27 preferably takes place in the MHz range. A small overall size of the coils for the inductive energy supply means 17 and 27 is achieved in this way. A further measure which improves the invention is considered to be that of equipping the coils for the inductive energy supply means 17 and 27 with a ferromagnetic material, such as open ferrite cores. Inductive coupling between the coils for the inductive energy supply means 17 and 27 is further improved in this way.

In an alternative refinement of the invention, provision can be made to transmit the electrical energy from the connecting electronics system 6 to the sensor electronics system 5 in the GHz range and, instead of the coils for the inductive energy supply means 17, to arrange SAW sensors for receiving the energy.

In a further, alternative refinement of the invention, provision can be made to transmit the electrical energy from the connecting electronics system 6 to the sensor electronics system 5 in the optical range. In this case, light-emitting diodes in the visible or infrared transmission range are provided instead of the coils for the inductive energy supply means 27, and photocells are provided instead of the coils for the inductive energy supply means 17.

The temperature sensor 4 can be in the form of a temperature-dependent resistor, in the form of a thermocouple or in the form of a barrier layer semiconductor. The measurement signal of the temperature sensor 4 is preprocessed in the sensor electronics system 5. In a first processing stage, the measurement signal is prepared, in the analog signal conditioning means 13, for the subsequent digitization in the analog/digital converter 14. The digitized measurement signal is wirelessly transmitted to the connecting electronics system 6 via the transceiver unit 16 with associated transmitting and receiving antennas 18.

The transmitted measurement signal is received by the transmitting and receiving antennas 28 of the transceiver unit 26 and passed on to the communication interface 19. The communication interface 19 is connected to a superordinate device, not illustrated. Communication 29 with said superordinate device can take place in a wireless manner or in a wired manner.

Wireless communication 12 is provided between the sensor electronics system 5 and the connecting electronics system 6, it being possible for the temperature and also optionally further information to be read from the sensor electronics system 5 by means of said communication. In the case of bidirectional communication, trigger signals or configuration commands can also be transmitted from the connecting electronics system 6 to the sensor electronics system 5.

Figure 6:
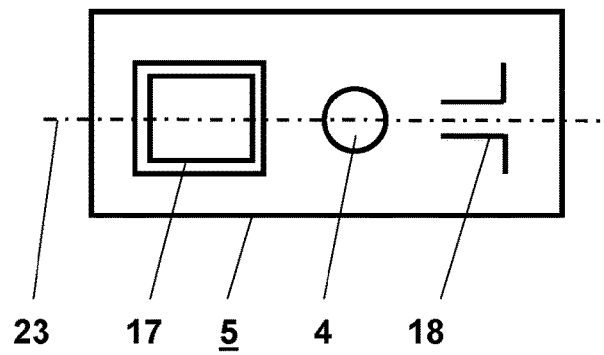
FIG. 6 an illustration of a detail of the mechanical structure of the sensor electronics system.

FIG. 6 shows the basic physical arrangement of the sensor electronics system 5. The coils for the inductive energy supply means 17, the temperature sensor 4 and the transmitting and receiving antennas 18 are arranged in series in the longitudinal direction on the sensor electronics system 5 along the tube axis 23 of the tube 2. The temperature sensor 4 can advantageously also be integrated on a substrate together with the sensor electronics system 5. In particular, provision is made for components which generate heat loss to be fitted at a sufficient distance from the temperature sensor 4, for example displaced in the axial direction of the tube axis 23 of the tube 2, in order to avoid temperature errors.

In an advantageous refinement of the invention, the communication between the sensor electronics system 5 and the connecting electronics system 6 is established by means of separate transmitting and receiving antennas 18, 28 digitally in accordance with one of the standards known per se, such as Bluetooth LE.

In an alternative, advantageous refinement of the invention, communication between the sensor electronics system 5 and the connecting electronics system 6 analogously takes place inductively. To this end, modulation of the signal, which is used for energy supply, in accordance with the principle of reflected impedance can be provided.

In a further, alternative refinement of the invention, the communication between the sensor electronics system 5 and the connecting electronics system 6 can take place by integration of energy supply and wireless communication by means of SAW technology.

Furthermore, analog capacitive communication between the sensor electronics system 5 and the connecting electronics system 6 is also feasible.

Finally, in the case of optical energy supply, it is feasible to likewise establish communication between the sensor electronics system 5 and the connecting electronics system 6 optically by modulating the returned light intensity.

Figure 7:
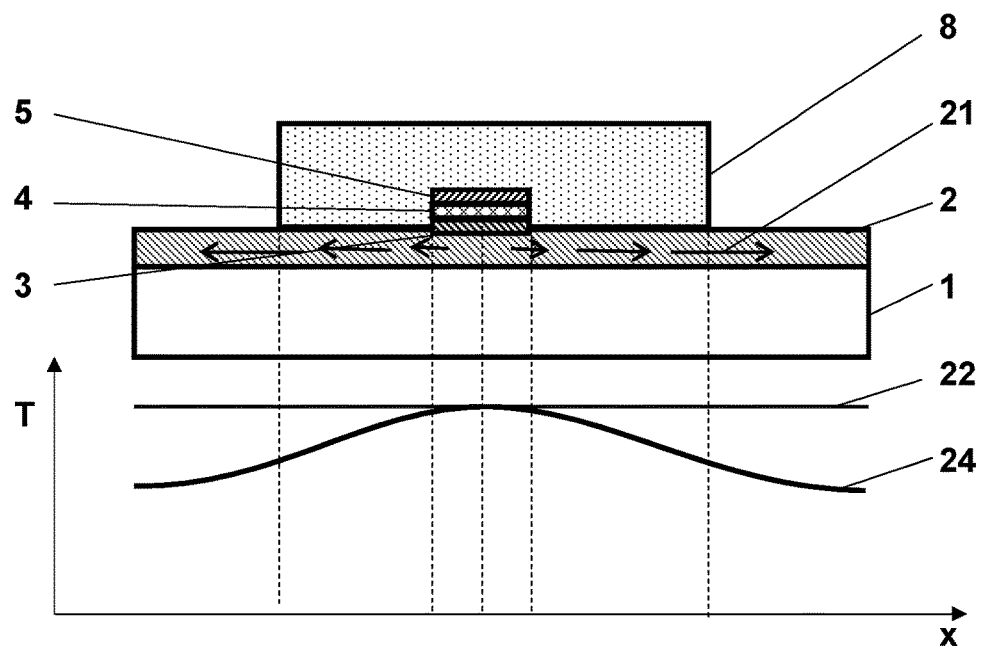
FIG. 7 a graphical illustration of the temperature distribution at the measurement point.

FIG. 7 shows a graphical illustration of the temperature distribution at the measurement point. Using identical reference symbols for identical means, said figure shows the arrangement of the sensor electronics system 5 with the temperature sensor 4 and the tube adapter 3 on the surface of a tube 2, of which a section is shown, which is at least partially or completely surrounded by a thermal insulation 8. In the case of a partial thermal insulation 8, the temperature sensor 4 is arranged approximately in the middle of the thermal insulation 8 in the longitudinal direction on the outer surface of the tube 2. Axial heat flows 21 are shown as arrows in the tube wall, the length of said arrows being a measure of the quantity of heat flow at the respective location of the tube wall. On account of the thermal insulation 8, heat flows 21 in the immediate vicinity of the measurement point are initially low and increase as the respective end of the thermal insulation 8 gets increasingly closer.

Based on the physical arrangement of the sensor electronics system 5 with the temperature sensor 4 on the tube wall, a temperature distribution of the fluid temperature 22 and a temperature distribution of the tube wall temperature 24 are plotted as temperature T against the length x of the tube 2. The fluid temperature 22 is constant along the tube 2. The thermal insulation 8 has the effect that the tube wall temperature 24 at the measurement point is the same as the fluid temperature 22 and decreases as a result of the heat flows 21 to the respective end of the thermal insulation 8. A high degree of measurement accuracy of the fluid temperature 22 at the measurement point is achieved in this way.

According to a further feature of the invention, the thermal insulation 8, 8' has a sufficient axial length in order to reduce the axial heat flows 21 in the tube wall 2 for achieving a virtually constant temperature distribution 22 to a minimum in the zone which is occupied by the thermal contact promoting device about its axial center.

The installation of the nonintrusive temperature measuring apparatus according to an aspect of the invention is advantageously possible on any desired straight tube section of sufficient length and is distinguished by a simple mechanical structure in this case. In particular, the temperature measuring apparatus according to an aspect of the invention can be fitted to a tube 2 which has already been laid, without interrupting operation (retrofitting), using simple means.

Furthermore, the temperature measurement by the temperature measuring apparatus according to an aspect of the invention is largely independent of radial and axial flows of heat at the measurement point. The sensitivity to the quality of the thermal coupling of the temperature measuring apparatus to the tube 2 is low. This advantage is particularly significant in industrial applications in order to meet the requirements in respect of robustness and long-term stability. As a result, a high degree of measurement accuracy is achieved overall.

On account of the wireless connection of the connecting electronics system 6, the need for electrical insulation of the temperature sensor 4 from the tube 2 is also dispensed with, as a result of which the mechanical system structure is further simplified and the thermal contact between the temperature sensor 4 and the contact area to the tube 2 is improved. The sensor response times are reduced as a result.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B and C.

LIST OF REFERENCE SYMBOLS

1 Fluid
2 Tube
3 Tube adapter
4, 4' Temperature sensor
5 Sensor electronics system
6 Connecting electronics system
7 Connection cable
8, 8' Insulation
9 Holder
10 Fixing means
11 Energy supply means
12 Wireless communication 13 Analog signal conditioning means
14 Analog/digital converter
15, 25 Energy supply unit
16, 26 Transceiver unit
17, 27 Coils for the inductive energy supply means
18, 28 Transmitting and receiving antennas
19 Communication interface
20 Local display unit
21 Heat flows
22 Fluid temperature
23 Tube axis
24 Tube wall temperature
29 Communication with a superordinate device
T Temperature
X Length

The invention claimed is:

1. A nonintrusive temperature measuring apparatus for measuring fluid temperature, the apparatus comprising:
a tube sheathed by a thermal insulation layer at least at a measurement point;
a sensor electronics system including a temperature sensor disposed on the tube within the thermal insulation layer; and
a connecting electronics system disposed on the thermal insulation layer, outside the thermal insulation layer, such that at least a portion of the thermal insulation layer is disposed between and contacting the connecting electronics system and the sensor electronics system,
wherein the sensor electronics system and the connecting electronics system each include an energy transceiver unit configured for wireless energy transmission for supplying energy to the sensor electronics system, and
wherein the sensor electronics system and the connecting electronics system each include a temperature transceiver unit configured for wireless communication of temperature measurement values from the sensor electronics system to the connecting electronics system.

2. The apparatus of claim 1, wherein the sensor electronics system includes an analog signal conditioner and wherein the temperature transceiver unit includes associated transmitting and receiving antennas.

3. The apparatus of claim 1, wherein the connecting electronics system includes a processing unit, a communication unit, and an energy supply unit.

4. The apparatus of claim 1, wherein the energy transceiver unit is configured for inductive wireless energy transmission for supplying energy to the sensor electronics system.

5. The apparatus of claim 1, wherein the temperature transceiver unit is configured for radio-based wireless communication for transmitting the temperature measurement values from the sensor electronics system to the connecting electronics system.

6. The apparatus of claim 1, wherein the energy transceiver unit is configured for inductive wireless energy transmission for supplying energy to the sensor electronics system, and the temperature transceiver unit is configured for radio-based wireless communication for transmitting the temperature measurement values from the sensor electronics system to the connecting electronics system.

7. The apparatus of claim 1, wherein the energy transceiver unit is configured for optical wireless energy transmission for supplying the sensor electronics system, and the temperature transceiver unit is configured for establishing the wireless communication for transmitting the temperature measurement values from the sensor electronics system to the connecting electronics system using modulating a returned light intensity.

8. The apparatus of claim 1, wherein the energy transceiver unit and the temperature transceiver unit are configured to use SAW technology.

9. The apparatus of claim 1, wherein the temperature sensor and the sensor electronics system are, together with a tube adapter, mounted onto the surface of the tube.

10. The apparatus of claim 9, wherein the tube adapter is matched to an outside diameter of the tube at a tube end, and
wherein the tube adapter is matched to a contour of the temperature sensor and of the sensor electronics system at a sensor end.

* * * * *